US012211358B2

(12) United States Patent
Reimer

(10) Patent No.: US 12,211,358 B2
(45) Date of Patent: Jan. 28, 2025

(54) GESTURE BASED INTERFACE FOR A PREMISES SECURITY SYSTEM

(71) Applicant: The ADT Security Corporation, Boca Raton, FL (US)

(72) Inventor: Mark Reimer, Denver, CO (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 17/951,705

(22) Filed: Sep. 23, 2022

(65) Prior Publication Data

US 2023/0096207 A1 Mar. 30, 2023

Related U.S. Application Data

(60) Provisional application No. 63/249,844, filed on Sep. 29, 2021.

(51) Int. Cl.
*G08B 13/196* (2006.01)

(52) U.S. Cl.
CPC . *G08B 13/19613* (2013.01); *G08B 13/19634* (2013.01)

(58) Field of Classification Search
CPC ....................... G08B 25/008; G08B 13/19613; G08B 19/00; G08B 21/22; G06F 3/017; G01S 13/88; G01S 13/426
See application file for complete search history.

(56) References Cited

U.S. PATENT DOCUMENTS

| | | | | |
|---|---|---|---|---|
| 8,243,993 | B2 | 8/2012 | Hsiao et al. | |
| 8,428,368 | B2 | 4/2013 | Ivanich et al. | |
| 10,890,653 | B2 | 1/2021 | Giusti et al. | |
| 10,901,497 | B2 | 1/2021 | Trotta | |
| 2011/0135148 | A1* | 6/2011 | Hsiao | G06V 40/28 382/103 |
| 2016/0041618 | A1 | 2/2016 | Poupyrev | |
| 2019/0171178 | A1* | 6/2019 | Burke | G05B 19/0428 |
| 2021/0132788 | A1* | 5/2021 | Giusti | G06F 3/017 |
| 2023/0251381 | A1* | 8/2023 | Ran | H04W 4/021 356/5.01 |
| 2023/0315211 | A1* | 10/2023 | Armstrong | G06V 40/20 382/103 |

FOREIGN PATENT DOCUMENTS

CN 111782037 A 10/2020

* cited by examiner

*Primary Examiner* — Mirza F Alam
(74) *Attorney, Agent, or Firm* — Weisberg I.P. Law, P.A.

(57) ABSTRACT

A control device in a premises security system configured to communicate with a premises device that includes a radar sensor for sensing hand gestures is provided. The control device receives signaling from the premises device indicative of a hand gesture, performs a first correlation of the hand gesture to a predetermined premises security system command, performs a second correlation of a verbal security password, a speaker voice recognition, a presence of the user's phone near the control device, a presence of a registered wearable near the control device, a camera viewing a registered home occupant inside the premises, or biometrics to the predetermined premises security system command, and performs a first action based on the first correlation and second correlation, such as arming or disarming the premises security system.

13 Claims, 9 Drawing Sheets

GESTURE BASED INTERFACE FOR A PREMISES SECURITY SYSTEM

CROSS-REFERENCE TO RELATED PATENT APPLICATION

This application is related to and claims priority to U.S. Provisional Patent Application Ser. No. 63/249,844, filed Sep. 29, 2021, entitled GESTURE BASED INTERFACE FOR A PREMISES SECURITY SYSTEM, the entirety of which is incorporated herein by reference.

TECHNICAL FIELD

The present invention relates to premises security systems, and in particular, gesture based control in a premises security system.

BACKGROUND

Hand gestures may be used for interacting with devices and may help simplify the user experience with the mobile device. That is, these devices use cameras to capture images/video of a hand gesture where the image/video is then processed by the device. As society is becoming more cautious when interacting with public devices, touchless alternatives are becoming increasingly prevalent from contactless credit cards in retail stores, to touchless hand dryers in public restrooms, to wave-activated parking ticketing machines.

However, existing security systems still require touch based interaction. For example, security systems use keypads with numbered buttons for arming and disarming the security alarm system. Typically, the security keypad is the first surface touched upon entering a home to disarm the security system. This could create concerns for hygienically aware and cautious consumers, and require more frequent cleaning of the security keypad buttons. Over time the buttons can start to wear showing signs of repeated use, and may compromise the consumer's secret PIN as the buttons for the PIN may show more wear than the other buttons.

SUMMARY

Some embodiments advantageously provide methods, systems, and apparatuses for a premises security system having a premises device and a control device such as for gesture based control in a premises security system.

According to one aspect of the invention, a control device in a premises security system includes processing circuitry configured to receive at least one signal indicative of at least one hand gesture, correlate the at least one hand gesture to a predetermined command, and perform at least one action based on the correlation.

According to another aspect of the invention, a control device in a premises security system is configured to communicate with a premises device that includes a radar sensor for sensing at least one hand gesture. The control device includes processing circuitry configured to receive at least one signal from the premises device, where the at least one signal is indicative of the at least one hand gesture, perform a first correlation of the at least one hand gesture to at least one predetermined premises security system command, and perform at least one first action in the premises security system based on the first correlation associated with the at least one predetermined premises security system command.

According to one or more embodiments of this aspect, the at least one hand gesture includes a plurality of hand gestures sensed in a predetermined sequence, where the predetermined sequence correlates to the at least one predetermined premises security system command, and/or within a predetermined time interval, where the plurality of hand gestures correlate to at least one predetermined premises security system command.

According to one or more embodiments of this aspect, the at least one first action includes one of arming the premises security system and disarming the premises security system.

According to one or more embodiments of this aspect, the at least one first action includes adding additional time to a predefined counter in the premises security system where expiration of the predefined counter is configured to trigger a premises security system alarm.

According to one or more embodiments of this aspect, the processing circuitry is further configured to perform a second correlation of at least one of a verbal security password, speaker voice recognition, presence of the user's phone near the control device, presence of a registered wearable near the control device, camera viewing a registered home occupant inside the premises, and biometrics to the at least one predetermined premises security system command, and the at least one first action in the premises security system is based on the second correlation associated with the at least one predetermined premises security system command.

According to another aspect of the invention, a premises security system includes a premises device in communication with a control device, where the premises device includes a radar sensor configured to sense hand based motion, and includes processing circuitry configured to determine whether the sensed hand based motion is associated with at least one hand gesture, and to transmit at least one signal indicative of the at least one hand gesture to the control device based on the determination that the hand based motion is associated with at least one hand gesture. The control device includes processing circuitry configured to receive at least one signal from the premises device, where the at least one signal is indicative of the at least one hand predetermined gesture, to perform a first correlation of the at least one hand predetermined gesture to at least one predetermined premises security system command, and to perform at least one first action in the premises security system based the first correlation associated with the at least one predetermined premises security system command.

According to one or more embodiments of this aspect, the at least one first action includes one of arming the premises security system and disarming the premises security system.

According to one or more embodiments of this aspect, the at least one hand gesture includes a plurality of hand gestures, where the plurality of hand gestures is sensed in at least one of a predetermined sequence and within a predetermined time interval.

According to one or more embodiments of this aspect, the at least one correlation further includes performing at least one of a verbal security password, speaker voice recognition, a presence of the user's phone near the control device, a presence of a registered wearable near the control device, a camera viewing a registered home occupant inside the premises, and biometrics.

According to one or more embodiments of this aspect, the at least one first action includes adding additional time to a predefined counter in the premises security system for performing at least one second action. According to one or more embodiments of this aspect, the at least one second action includes one of arming the premises security system, disarming the premises security system, performing a home automation function, and transmitting instructions to the premises device to arm or disarm the premises security system, and transmitting instructions to the premises device to perform a home automation function.

According to another aspect of the disclosure, a method is implemented by a control device in a premises security system where the control device is configured to communicate with a premises device that includes a radar sensor for sensing at least one hand gesture. At least one signal is received from a premises device, where the at least one signal is indicative of the at least one hand gesture. A first correlation is performed of the at least one hand gesture to at least one predetermined premises security system command. At least one first action is performed in the premises security system based on the first correlation associated with the at least one predetermined premises security system command.

According to one or more embodiments of this aspect, the at least one hand gesture includes a plurality of hand gestures sensed in at least one of a predetermined sequence, where the predetermined sequence correlates to the at least one predetermined premises security system command, and within a predetermined time interval, where the plurality of hand gestures correlates to at least one predetermined premises security system command.

According to one or more embodiments of this aspect, the at least one first action includes arming or disarming the premises security system.

According to one or more embodiments of this aspect, the at least one first action includes adding additional time to a predefined counter in the premises security system, where expiration of the predefined counter is configured to trigger a premises security system alarm.

According to one or more embodiments of this aspect, a second correlation is performed of at least one of a verbal security password, a speaker voice recognition, a presence of the user's phone near the control device, a presence of a registered wearable near the control device, a camera viewing a registered home occupant inside the premises, and biometrics to the at least one predetermined premises security system command. The at least one first action in the premises security system is based on the second correlation associated with the at least one predetermined premises security system command.

According to one or more embodiments of this aspect, the method includes determining whether the at least one hand gesture corresponds to at least one of a first user and a second user, wherein, if the at least one hand gesture corresponds to a first user, the at least one first action includes arming the premises security system, and if the at least one hand gesture corresponds to a second user, the at least one first action includes disarming the premises security system.

According to another aspect of the invention, a control device in a premises security system is provided. The control device is configured to communicate with a premises device that includes a radar sensor for sensing at least one hand gesture. The control device includes processing circuitry configured to receive at least one signal from the premises device, where the at least one signal is indicative of the at least one hand gesture, perform a first correlation of the at least one hand gesture to at least one predetermined premises security system command, perform a second correlation of at least one of a verbal security password, a speaker voice recognition, a presence of the user's phone near the control device, a presence of a registered wearable near the control device, a camera viewing a registered home occupant inside the premises, and biometrics to the at least one predetermined premises security system command, and perform at least one first action in the premises security system based on the first correlation and second correlation, where the at least one first action includes arming or disarming the premises security system.

According to one or more embodiments of this aspect, the at least one hand gesture includes a plurality of hand gestures sensed in a predetermined sequence, where the predetermined sequence correlates to the at least one predetermined premises security system command.

According to one or more embodiments of this aspect, the plurality of hand gestures is sensed within a predetermined time interval, where the plurality of hand gestures sensed within the predetermined time interval correlating to the at least one predetermined premises security system command.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
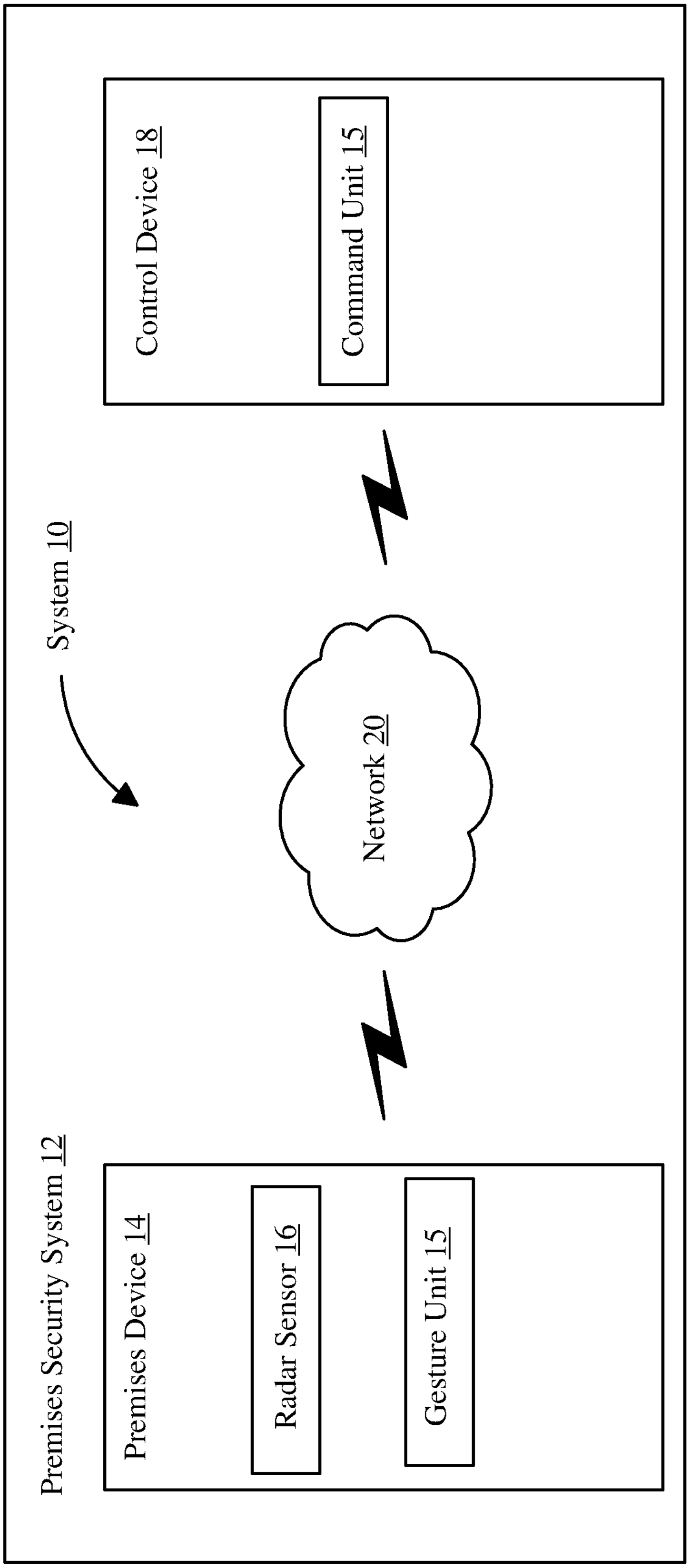
FIG. 1 is a diagram of an example system comprising a premises security system according to principles disclosed herein.

Before describing in detail example embodiments, it is noted that the embodiments reside primarily in combinations of apparatus components and processing steps related to a premises device and control device of a premises security system related to gesture based control in a premises security system. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

Note further, that functions described herein as being performed by a premises device or a control device may be distributed over a plurality of premises devices and/or control devices. In other words, it is contemplated that the functions of the control device and premises device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide a premises security system that includes a premises device and a control device in communication with the premises device. The premises security system is configured for the contactless detection or sensing of a user input that may trigger the execution of a specific function to be performed by the premises security system, such as, for example, arming or disarming the security system.

Referring now to the drawing figures, in which like elements are referred to by like reference numerals, there is shown in FIG. 1 a schematic diagram of a system 10 according to an embodiment of the present invention. System 10 includes a premises security system 12, which includes a premises device 14. Although the premises security system 12 is shown as including premises device 14, premises security system 12 is not limited to including only premises device 14 and may include additional premises devices 14 and/or other devices. Any premises device 14 can be in simultaneous communication and/or configured to separately communicate with more than one other premises device 14 and/or other premises security system 12 and/or other system 10. Although premises device 14 is included in the premises security system 12, the premises device 14 is not limited to being included in the premises security system 12 and/or system 10 and may reside standing alone, as part of another system (e.g., home automation system), or in any other manner.

Further, the premises device 14 may include sensors, control panels, control devices, image capture devices, and/or other devices. Image capture devices may include digital cameras and/or video cameras, among other image capture devices that are well known in the art. Additionally, the premises device 14 may also include one or more miniature high-speed sensors that are configured to detect motion with sub-millimeter accuracy. For example, the high-speed sensor may emit electromagnetic waves in a broad beam where the hand gesture reflects a portion of this energy back to the high-speed sensor. The properties of the reflected signal such as energy, time delay and frequency shift, for example, are analyzed and used to determine one or more characteristics of the object, i.e., hand. Some examples of one or more characteristics include size, shape, orientation, distance, velocity, etc. By analyzing the temporal variations and characteristics, the sensor can distinguish between complex movements to determine the hand's size, shape, orientation, distance, and velocity within the sensor's field.

The premises security system 12 may also include a control device 18, which may include a command unit 19 configured for performing certain monitoring, configuration and/or control functions associated with the premises security system 12. For example, the control device 18 may be in wired and/or wireless communication with the premises device 14. The premises device 14 is configured to transmit at least one signal indicative of a sensed or detected user input to the command unit 19 of the control device 18. The command unit 19 is configured to perform one or more monitoring, configuration and/or control functions associated with the premises security system 12 based on the sensed or detected user input. As described in more detail below, in one configuration, the user input may include at least one hand gesture.

Further, system 10 may include network 20, which may be configured to provide communication, e.g., wired and/or wireless communication between components of system 10, e.g., between premises device 14 and the control device 18. For example, the premises device 14 may communicate with the control device 18 via network 20 to transmit or otherwise convey at least one signal indicative of the hand gestures, or other user inputs, sensed by a radar sensor 16 to the control device 18. Additionally and/or alternatively, in one configuration, the premises device 14 may also be in direct communication with the control device 18 via one or more wireless protocols such as, for example, Bluetooth®, or a wired connection extending therebetween.

Example implementations, in accordance with an embodiment, of the premises device 14 and control device 18 discussed in the preceding paragraphs will now be described with reference to FIGS. 2 and 3.

Figure 2:
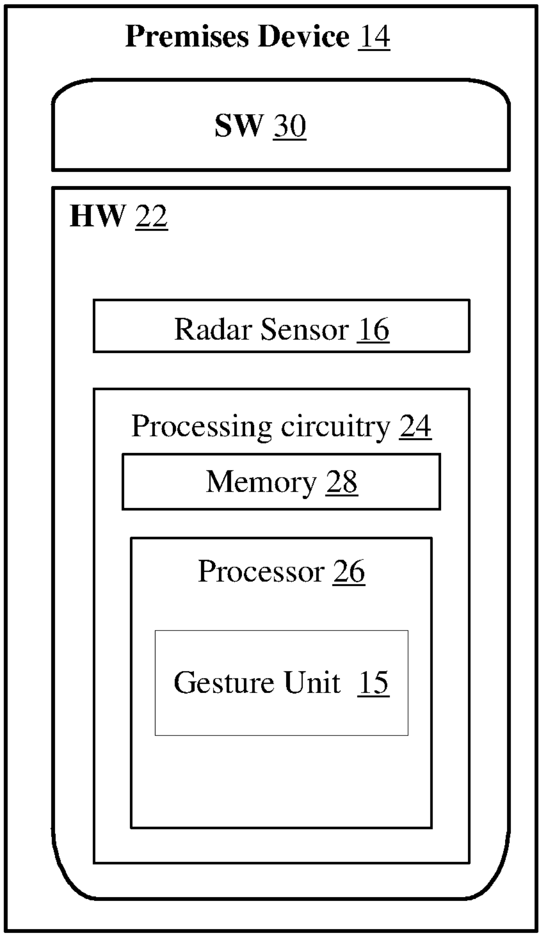
FIG. 2 is a block diagram of a premises device of the premises security system of FIG. 1 in accordance with the principles of the present invention.

With respect to FIG. 2, the premises device 14 is configured to include the radar sensor 16 configured to transmit and receive radar signals to detect or sense a user input. For example, in some configurations, the radar sensor 16 is configured to detect at least one hand gesture. In other configurations, the radar sensor 16 may also be configured to detect or sense any other bodily or anatomical gesture not limited to the user's hand where the detection is based on radar. This may include, but is not limited to, facial and/or iris recognition, or other bodily or anatomical movements. In one embodiment, the radar sensor 16 may be a 60 GHz or a 24 GHz radar sensor 16 configured to track sub-millimeter motion. However, it is to be understood that the radar sensor 16 may be a sensor greater or less than 24 GHz and 60 GHz. Each hand gesture may be a contactless user input that may be correlated, or otherwise associated, with a predetermined operation or command, such as, as non-limiting examples, arming and/or disarming the premises security system 12, initiating an alert to be sent to law enforcement or a remote security monitoring center, locking and/or disarming various individual physical barriers or doors, issuing an audible warning or alert (for example, to deter intruders or criminals from entering the premises), silencing an alert or alarm, turning individual lights/outlets on or off around the premises (for example, turning on or off a hallway or bedroom light), and/or scheduling timers to automatically arm and/or disarm the premises security system 12.

Premises device 14 is further configured to include a gesture unit 15 which is configured at least to be in communication with the radar sensor 16 and determine whether each sensed or detected hand gesture, or sequence of hand gestures, is a recognized hand gesture or sequence. If the hand gesture is recognized, the gesture unit 15 then transmits the at least one signal indicative of the hand gesture to the command unit 19 of the control device 18 which associates the detected hand gesture or sequence with a predetermined command, operation, or function as discussed below. In one or more configurations, the radar sensor 16 and gesture unit 15 functionality may be implemented in the control device 18. Alternatively, in one or more configurations, command unit 19 functionality, as described herein, may be implemented in premises device 14.

Continuing to refer to FIG. 2, the premises device 14 is configured to include hardware (HW) 22. The hardware 22 may include processing circuitry 24, which may include a processor 26 and a memory 28. In particular, in addition to or instead of a processor, such as a central processing unit and memory, the processing circuitry 24 may include integrated circuitry for processing and/or control, e.g., one or more processors and/or processor cores and/or FPGAs (Field Programmable Gate Array) and/or ASIC's (Application Specific Integrated Circuitry) adapted to execute instructions. The processor 26 may be configured to access (e.g., write to and/or read from) the memory 28, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Further, memory 28 may be configured as a storage device.

The premises device 14 is also configured to include software (SW) 30. The software 30 is stored internally in, for example, memory 28, or stored in external memory (e.g., database, storage array, network storage device, etc.) may be accessible by the premises device 14 via an external connection. The software 30 may be executable by the processing circuitry 24.

The processing circuitry 24 may be configured to control any of methods and/or processes described herein and/or to cause such methods, and/or processes to be performed, e.g., by the premises device 14. Processor 26 corresponds to one or more processors 26 for performing premises device 14 functions described herein. In some embodiments, the software 30 may include instructions that, when executed by the processor 26 and/or processing circuitry 24, causes the processor 26 and/or processing circuitry 24 to perform the processes described herein with respect to the premises device 14. For example, processing circuitry 24 may include gesture unit 15 which is configured to perform one or more premises device 14 functions described herein such as with respect to gesture detection.

Figure 3:
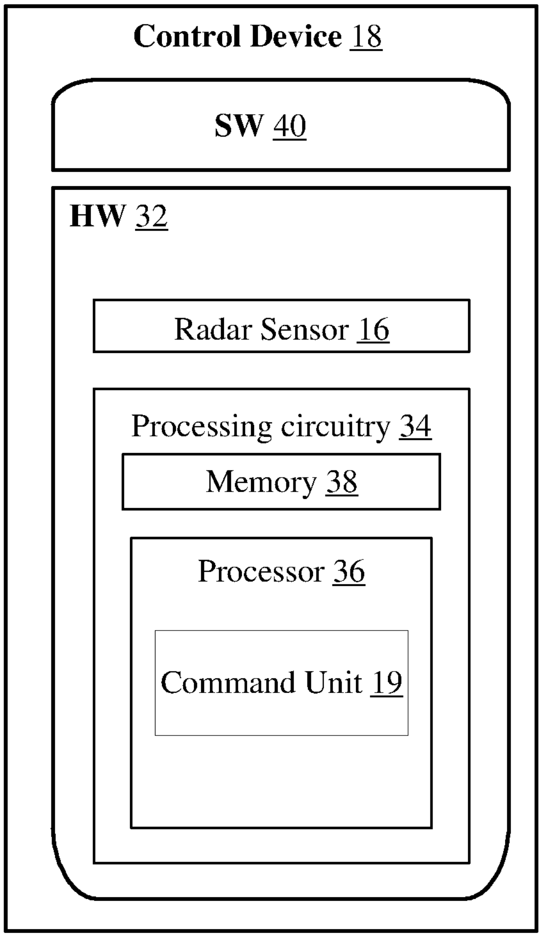
FIG. 3 is a block diagram of a control device of the premises security system of FIG. 1 in accordance with the principles of the present invention.

Continuing to refer to FIG. 3, the control device 18 of the premises security system 12 is configured to include hardware (HW) 32. The hardware 32 may include processing circuitry 34, which may include a processor 36 and a memory 38. In particular, in addition to or instead of a processor, such as a central processing unit and memory, the processing circuitry 34 may include integrated circuitry for processing and/or control, e.g., one or more processors and/or processor cores and/or FPGAs (Field Programmable Gate Array) and/or ASIC' s (Application Specific Integrated Circuitry) adapted to execute instructions. The processor 36 may be configured to access (e.g., write to and/or read from) the memory 38, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Further, memory 38 may be configured as a storage device.

The control device 18 further includes software (SW) 40. The software 40 may be stored internally in, for example, memory 38, or stored in external memory (e.g., database, storage array, network storage device, etc.) may be accessible by the control device 18 via an external connection. The software 40 may be executable by the processing circuitry 34.

The processing circuitry 34 may be configured to control any of methods and/or processes described herein and/or to cause such methods, and/or processes to be performed, e.g., by the control device 18. Processor 36 corresponds to one or more processors 36 for performing control device 18 functions described herein. In some embodiments, the software 40 may include instructions that, when executed by the processor 36 and/or processing circuitry 34, causes the processor 36 and/or processing circuitry 34 to perform the processes described herein with respect to the control device 18. For example, processing circuitry 34 may include command unit 19 which is configured and/or programmed to one or more control device 18 functions described herein such as with respect to causing a premises security system action based at least on the sensed hand gesture. For example, once the at least one signal indicative of at least one hand gesture is transmitted from the premises device 14 to the control device 18, the command unit 19 of the control device 18 correlates the sensed at least one hand gesture to a predetermined command, such as, as mentioned above, arming or disarming the premises security system 12. As described herein, arming and/or disarming the premises security system 12 may refer to enabling or disabling any alarm, alert, warning, lock, network-based or physical barrier, of the premises security system 12.

Although FIGS. 1-3 show various "units," such as gesture unit 15 and command unit 19, as being within a respective processor, it is contemplated that these units may be implemented such that a portion of each unit is stored in a corresponding memory within the respective processing circuitry. In other words, the gesture unit 15 and command unit 19 may be implemented in hardware or in a combination of hardware and software within the respective processing circuities.

Figure 4:
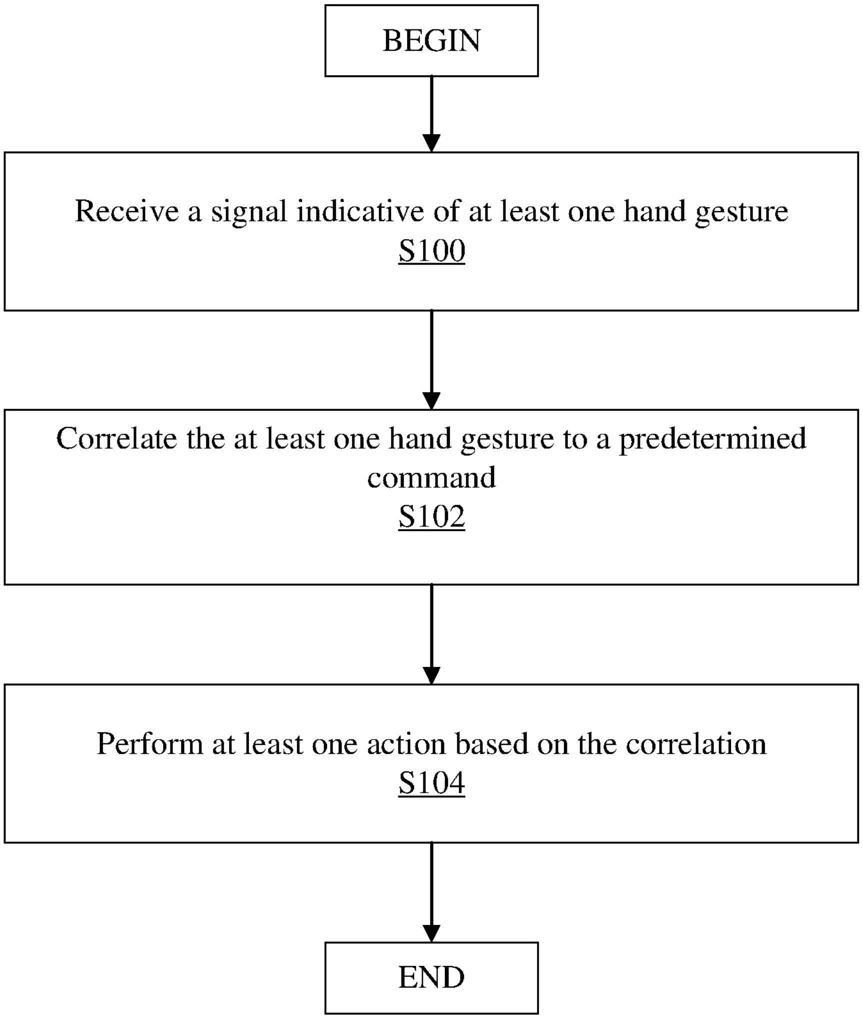
FIG. 4 is a flowchart of a process of the control device in accordance with the principles of the present invention.

FIG. 4 is a flow chart of an example method implemented by the control device 18 of the premises security system 12. One or more blocks described herein may be performed by one or more elements of control device 18 such as by the processing circuitry 34 (including the command unit 19) and/or processor 36. The control device 18 is configured to receive at least one signal from the premises device 14 and/or other devices. For example, control device 18 may receive at least one signal indicative of at least hand gesture or other user input from the premises device 14 (Block S100). The control device 18 is configured to correlate the at least one hand gesture, or other touchless user input (hand gesture and touchless user input are collectively referred to herein as a "hand gesture"), to a predetermined command (Block S102). The control device 18 is configured and/or programmed to then perform, or initiate the performance of, at least one action based on the correlation of the received at least one hand gesture to the predetermined command (Block S104).

According to one or more embodiments, the at least one action may include one of arming and disarming the premises security system 12 and/or transmitting at least one signal or instructions to the premises device 14 to arm or disarm the premises security system 12. In other words, the premises security system 12 may be armed or disarmed by the control device 18 and/or the premises device 14 once it has received instructions from the control device 18. According to one or more embodiments, the at least one hand gesture includes a plurality of hand gestures where the plurality of hand gestures are sensed in at least one of a predetermined sequence and within a predetermined time interval.

According to one or more embodiments, the at least one action may include adding additional time to a predefined/preconfigured timer/counter in the premises security system 12 for performing an action and/or before the premises security system 12 perform an action. That is, when users come home where the premises security system 12 is armed away, they have a limited predefined amount of time (e.g., 60 seconds) to disarm their premises security system 12 before the alarm goes off or is trigger. Oftentimes, such users may need a little more time to get to the security system keypad or touchscreen display (e.g., premises device 14 used to disarm/arm the premises security system 12), or to open a mobile app associated with the premises security system 12, and disarm the premises security system 12. This may be because a child was the first one to open the door, starting the entry delay for the alarm, while a parent is bringing in things in from the car. For these scenarios where a user may need more time to, for example, disarm the premises security system 12, a hand gesture or sequence of hand gestures may be used to indicate to the premises security system 12 to add more time/delay before an action is triggered. In one example, this hand gesture is represented as a closed fist with the index finger pointing upward. When this hand gesture is recognized/detected as described herein, a predefined amount of time (e.g., 60 additional seconds) are added to the preconfigured exit/entrance delay timer. The additional amount of time to be added is configurable and can be configured, for example, from 15-90 seconds. This hand gesture is supported in both close proximity to the radar sensor 16 as well as far (e.g., up to 20 feet) away from the radar sensor 16.

Further, in one or more embodiments, for increased security, the gesture based control/interface may be used in conjunction with at least a second factor such as a verbal security password, speaker voice recognition, presence of the user's mobile phone near the control device 18 or security base, presence of a registered wearable near the control device 18, camera viewing a registered home occupant inside the premises, biometrics, among other secondary or two factor authentication processes.

Figure 5:
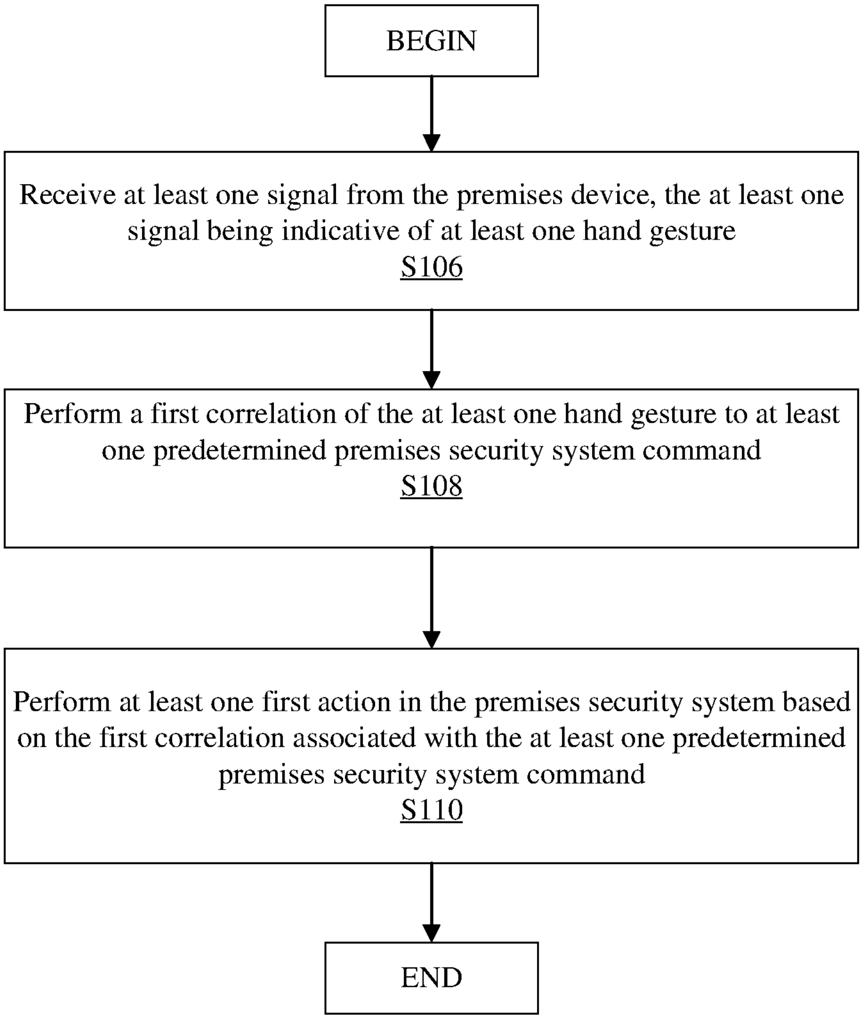
FIG. 5 is a flowchart of another process of the control device in accordance with the principles of the present invention.

FIG. 5 is a flow chart of an example method implemented by the control device 18 of the premises security system 12. One or more blocks described herein may be performed by one or more elements of control device 18 such as by the processing circuitry 34 (including the command unit 19) and/or processor 36. The control device 18 is configured to receive at least one signal from the premises device 14 and/or other devices. For example, control device 18 may receive at least one signal indicative of at least one hand gesture or other user input from the premises device 14 (Block S106). The control device 18 is configured to correlate the at least one hand gesture, or other touchless user input (hand gesture and touchless user input are collectively referred to herein as a "hand gesture"), to a predetermined command (Block S108). The control device 18 is configured and/or programmed to then perform, or initiate the performance of, at least one action based on the correlation of the received at least one hand gesture to the predetermined command (Block S110).

According to one or more embodiments, the at least one hand gesture includes a plurality of hand gestures sensed in at least one of: a predetermined sequence, the predetermined sequence correlating to the at least one predetermined premises security system command; and within a predetermined time interval, the plurality of hand gestures correlating to at least one predetermined premises security system command.

According to one or more embodiments, the at least one first action includes one of arming the premises security system 12 and disarming the premises security system 12.

According to one or more embodiments, the at least one first action includes adding additional time to a predefined counter in the premises security system 12 where expiration of the predefined counter is configured to trigger a premises security system alarm. That is, when users come home where the premises security system 12 is armed away, they have a limited predefined amount of time (e.g., 60 seconds) to disarm their premises security system 12 before the alarm goes off or is trigger. Oftentimes, such users may need a little more time to get to the security system keypad or touchscreen display (e.g., premises device 14 used to disarm/arm the premises security system 12), or to open a mobile app associated with the premises security system 12, and disarm the premises security system 12. This may be because a child was the first one to open the door, starting the entry delay for the alarm, while a parent is bringing in things in from the car. For these scenarios where a user may need more time to, for example, disarm the premises security system 12, a hand gesture or sequence of hand gestures may be used to indicate to the premises security system 12 to add more time/delay before an action is triggered. In one example, this hand gesture is represented as a closed first with the index finger pointing upward. When this hand gesture is recognized/detected as described herein, a predefined amount of time (e.g., 60 additional seconds) are added to the preconfigured exit/entrance delay timer. The additional amount of time to be added is configurable and can be configured, for example, from 15-90 seconds. This hand gesture is supported in both close proximity to the radar sensor 16 as well as far (e.g., up to 20 feet) away from the radar sensor 16.

According to one or more embodiments, the processing circuitry 34 is further configured to perform a second correlation of at least one of a verbal security password, speaker voice recognition, presence of the user's phone near the control device 18, presence of a registered wearable near the control device 18, camera viewing a registered home occupant inside the premises, and biometrics to the at least one predetermined premises security system command; and the at least one first action in the premises security system 12 being based on the second correlation associated with the at least one predetermined premises security system command.

Figure 6:
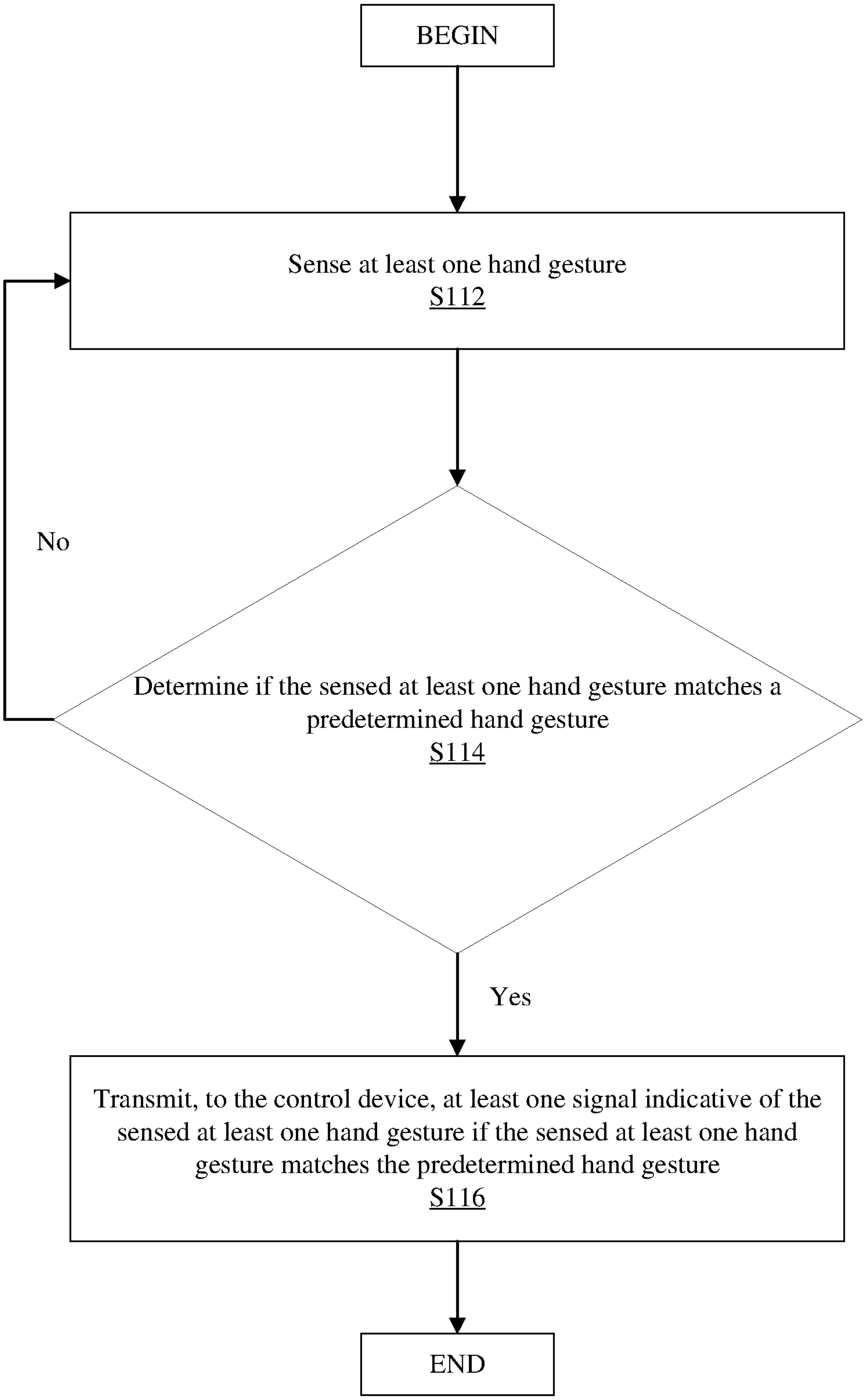
FIG. 6 is a flowchart of a process of the premises device in accordance with the principles of the present invention.

FIG. 6 is a flow chart of an example process implemented by the premises device 14 in the premises security system 12. One or more blocks described herein may be performed by one or more elements of premises device 14 such as by the processing circuitry 24 (including the gesture unit 15) and/or processor 26. The radar sensor 16 of the premises device 14 is configured to sense at least one user input. For example, premises device 14 may be configured to sense at least one hand gesture from a user (Block S112). The premises device 14 is configured to then determine if the sensed at least one hand gesture matches a predetermined hand gesture that may be stored in memory 28 (Block S114). If the sensed at least one hand gesture does not match the predetermined hand gesture stored in memory 28, Blocks S112-S114 of the process may be iteratively repeated. However, if the sensed at least one hand gesture does match the predetermined hand gesture stored in memory 28, the premises device 14 transmits at least one signal indicative of the sensed at least one hand gesture to the control device 18 (Block S116).

In some configurations, the at least one hand gesture may correspond to a plurality of hand gestures that are determined by, for example, control device 18 to meet at least one predefined criterion such as a plurality of hand gestures detected in a predetermined sequence and/or within a predetermined time interval. In some such configurations in which the hand gestures are detected in a sequence, the sequence may be correlated to or associated with by, for example, control device 18 to a particular command, operation, or executable function/series of functions. For example, when the plurality of hand gestures are performed by a user (and detected by control device 18 and/or premises device 14) in first predefined sequence, the hand gestures may be determined to be associated with a first command such as to, for example, arm or disarm the premises security system 12.

In another example, when the plurality of hand gestures are performed by a user (and detected by control device 18 and/or premises device 14) in a second predefined sequence, the hand gestures may be determined to be associated with a second command such as to, for example, lock and/or unlock individual doors (e.g., residential, commercial, or garage doors) or physical barriers (e.g., gates or blockades) connected to the premises security system 12. In another example, when the plurality of hand gestures are performed by the user (and detected by control device 18 and/or premises device 14) in a third predefined sequence, the hand gestures may be determined to be associated with a third command such as to, for example, initiate, cease, or suspend the sounding of an audible alert or alarm. It is to be understood that the sequence of hand gestures are not limited to the aforementioned commands, and thus, may include other premises security system 12 based executable commands, functions, or operations not described in detail herein.

As mentioned above, in one or more embodiments, the plurality of hand gestures, including sequences of hand gestures, may be performed within a predetermined time interval, and subsequently associated with a particular command based at least on whether or not the hand gestures are performed within the predetermined time interval. For example, in some configurations where the plurality of hand gestures are associated with a particular predetermined command, the command may only be executed or performed by the premises security system 12 if the hand gestures (or sequence of hand gestures) are performed within a predefined time interval (e.g., performed within 5, 10, or 15 seconds, etc.).

Further, the radar sensor 16 may be further configured to detect hand gestures, or sequences of hand gestures, associated with specific users such as based on one or more characteristics associated with the specific users such as hand size (e.g., length of one or more fingers), height of hand (as determined, for example, relative to a transmitted and/or receive angle of the radar signals with respect to radar sensor 16), user specific hand gestures/sequence, etc. For example, a first detected sequence of hand gestures to arm and/or disarm the premises security system 12 may be associated with a first user. A second detected sequence of hand gestures to arm and/or disarm the premises security system may be associated with a second user, and so on.

Additionally, in some configurations, when identifying specific users based on the detected hand gestures and/or hand characteristic(s), certain permissions may be assigned to the identified user. For example, if a first user is detected, the first user may be assigned a first set of permissions (e.g., the authority to arm and/or disarm the premises security system 12) whereas a second user is assigned a second set of permissions (e.g., only the authority to lock or unlock particular doors) where the second set of permissions may be more restrictive than the first set of permissions. Also, in situations in which a guest or visitor is assigned certain permissions, the assigned permissions to the guest or visitor may expire after a certain/predefined period of time and/or a particular date.

As described herein, the hand gestures may be initially detected or sensed by the premises device 14 (including the radar sensor 16), which then transmits the detected hand gestures (or signal indicative of the detect hand gesture(s)) to the control device 18. The control device 18 then associates the hand gestures or signals to the respective command, operation, or function to be performed or executed.

In one or more embodiments, a sequence of hand gestures may be configured to cause, for example, control device 18 to trigger lifestyle mode or functions such as turning off the lights in a particular location in the premises, turn off all the lights at the premises, lower the A/C temperature, turn on one or more appliances, etc.

In one or more embodiments, a hand gesture or sequence of hand gestures, for example, may be configured to cause, for example, control device 18 to automatically trigger the alarm and/or silently alert the monitoring station to initiate first responders to the premises such as when an operator or user of the premises device 14 is under duress and/or panic due to the presence of an intruder, an adverse health condition (e.g., a heart attack or stroke), or a dangerous environmental condition (e.g., flooding or fire).

Figure 7:
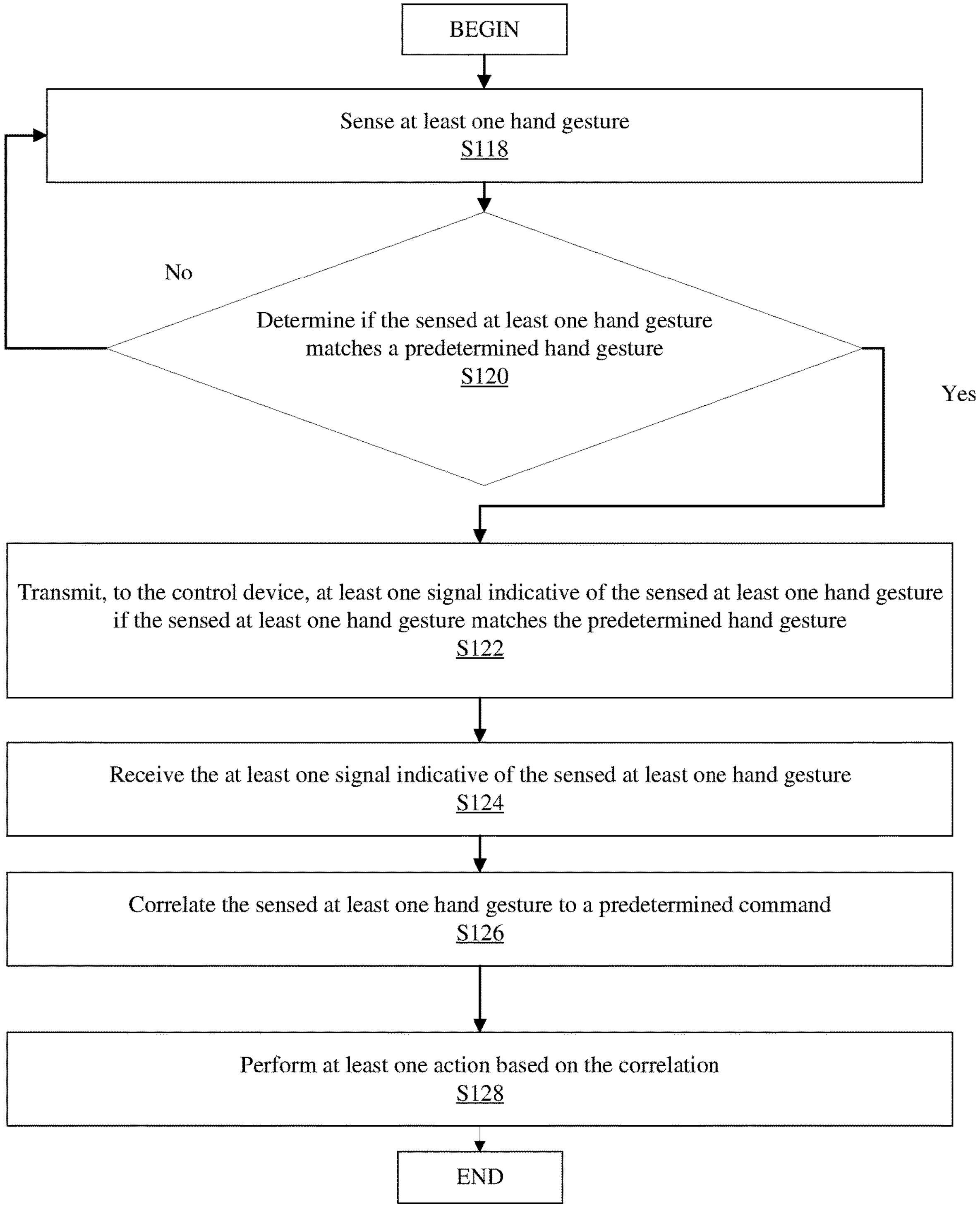
FIG. 7 is a flowchart of a process of the premises security system in accordance with the principles of the present invention.

FIG. 7 is a flow chart of an example process in the premises security system 12. One or more blocks described herein may be performed by one or more elements of premises device 14 and/or control device 18 such as by one or more of processing circuitries 24 and 34, respectively, (including the gesture unit 15 and command unit 19) and/or processors 26 and 36, respectively. First, the radar sensor 16 of the premises device 14 senses or otherwise detects at least one hand gesture or other user input (Block S118). The premises device 14 is configured to determine whether the sensed at least one hand gesture matches a predefined hand gesture stored within memory 28 (Block S120). If the sensed at least one hand gesture matches a predefined hand gesture, the premises device 14 is configured to cause transmission of at least one signal indicative of the sensed at least one hand gesture to the control device 18 (Block S122), which receives the at least one signal (Block S124). In other words, the premises device 14 may only transmit signals indicative of hand gestures that it recognizes (i.e., hand gestures that match hand gestures stored within the memory 28 of the processing circuitry 24). Once received by the control device 18, the processing circuitry 34 (including the command unit 19) is configured to correlate the sensed at least one hand gesture to a predetermined command (e.g., a command to arm or disarm the premises security system 12) (Block S126). The control device 18 is configured to perform at least one action (e.g., arming or disarming the premises security system 12) based on the correlation (Block S128). Additionally, and/or alternatively, the control device 18 may also cause transmission of at least one signal back to the premises device 14 to perform or execute at least one action based on the correlation between the sensed at least one hand gesture and the predetermined command.

According to one or more embodiments, the at least one action includes one of arming the premises security system and disarming the premises security system. According to one or more embodiments, the at least one hand gesture includes a plurality of hand gestures where the plurality of hand gestures are sensed in at least one of a predetermined sequence and within a predetermined time interval. According to one or more embodiments, the radar sensor is configured to track sub-millimeter motion, and the radar sensor is one of a 60 GHz radar sensor and a 24 GHz radar sensor.

In one or more embodiments, gesture based control/interface for the premises security system 12 may be enabled and/or disabled based on one or more time-based rules. For example, gesture based control for the premises security system 12 may be enabled during a predefined time window/period while such gesture based control may be disable during a different time window/period (e.g., disabled between midnight and 6 am).

Figure 8:
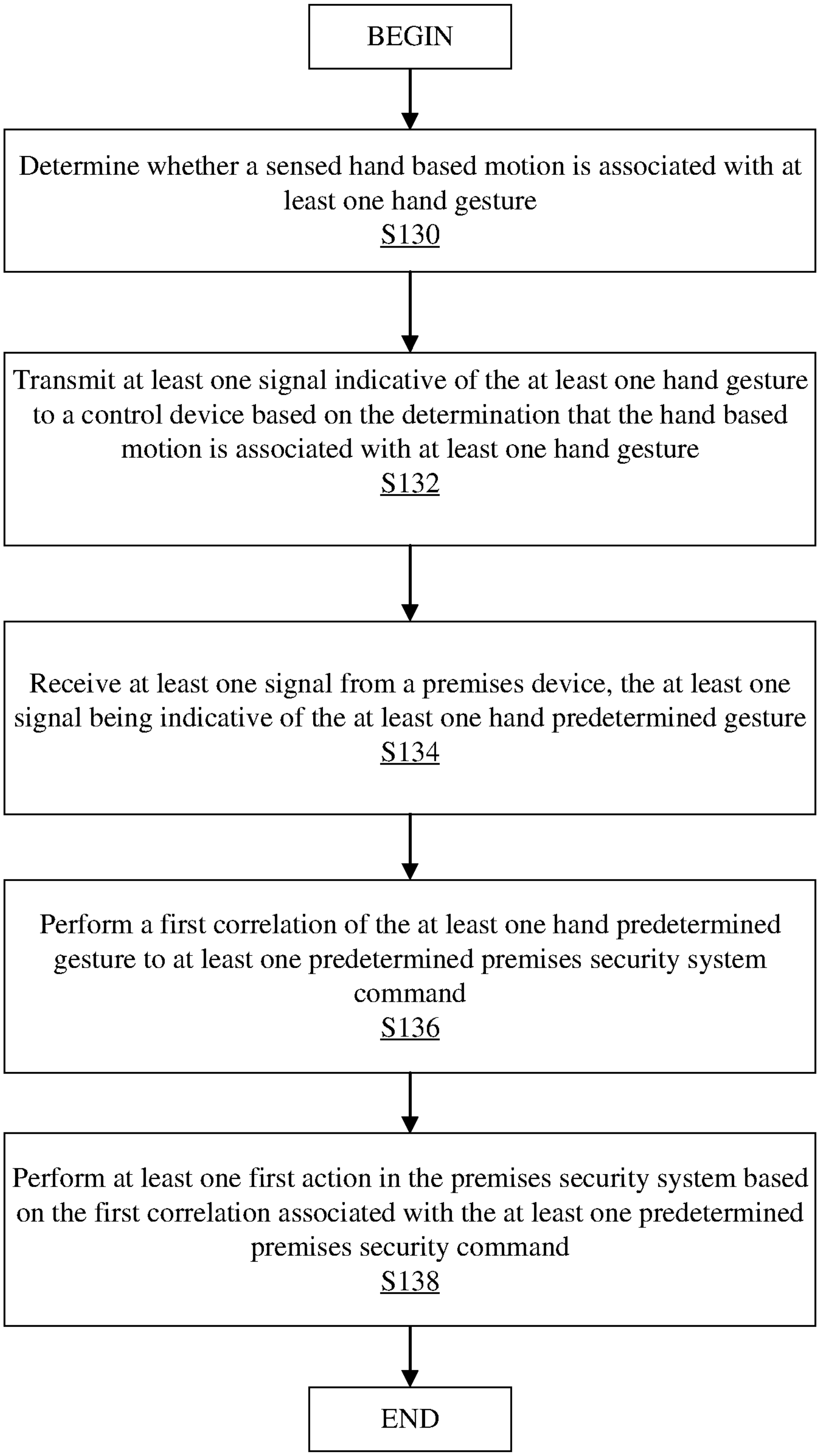
FIG. 8 is a flowchart of another process of the premises security system in accordance with the principles of the present invention.

FIG. 8 is a flow chart of an example process in the premises security system 12. One or more blocks described herein may be performed by one or more elements of premises device 14 and/or control device 18 such as by one or more of processing circuitries 24 and 34, respectively, (including the gesture unit 15 and command unit 19) and/or processors 26 and 36, respectively. First, the premises device 14 is configured to determine whether the sensed hand based motion is associated with at least one hand gesture (Block S130). Then, the premises device 14 is configured to cause transmission (Block S132) of at least one hand gesture (e.g., a signal indicative of the at least one hand gesture) to a control device 18 based on the determination that the hand based motion is associated with at least one hand gesture, which receives (Block S134) the at least one signal from the premises device 14, the at least one signal being indicative of the at least one hand predetermined gesture. In other words, the premises device 14 may only transmit signals indicative of hand gestures that it recognizes (i.e., hand gestures that match hand gestures stored within the memory 28 of the processing circuitry 24). Once received by the control device 18, the processing circuitry 34 (including the command unit 19) is configured to perform (Block S136) a correlation of the at least one hand predetermined gesture to at least one predetermined security system command (e.g., a command to arm or disarm the premises security system 12). The control device 18 is configured to perform (Block S138) at least one action in the premises security system 12 (e.g., arming or disarming the premises security system 12) based on the first correlation associated with the at least one predetermined premises security command. Additionally, and/or alternatively, the control device 18 may also cause transmission of at least one signal back to the premises device 14 to perform or execute at least one action based on the correlation between the sensed at least one hand gesture and the predetermined command.

Figure 9:
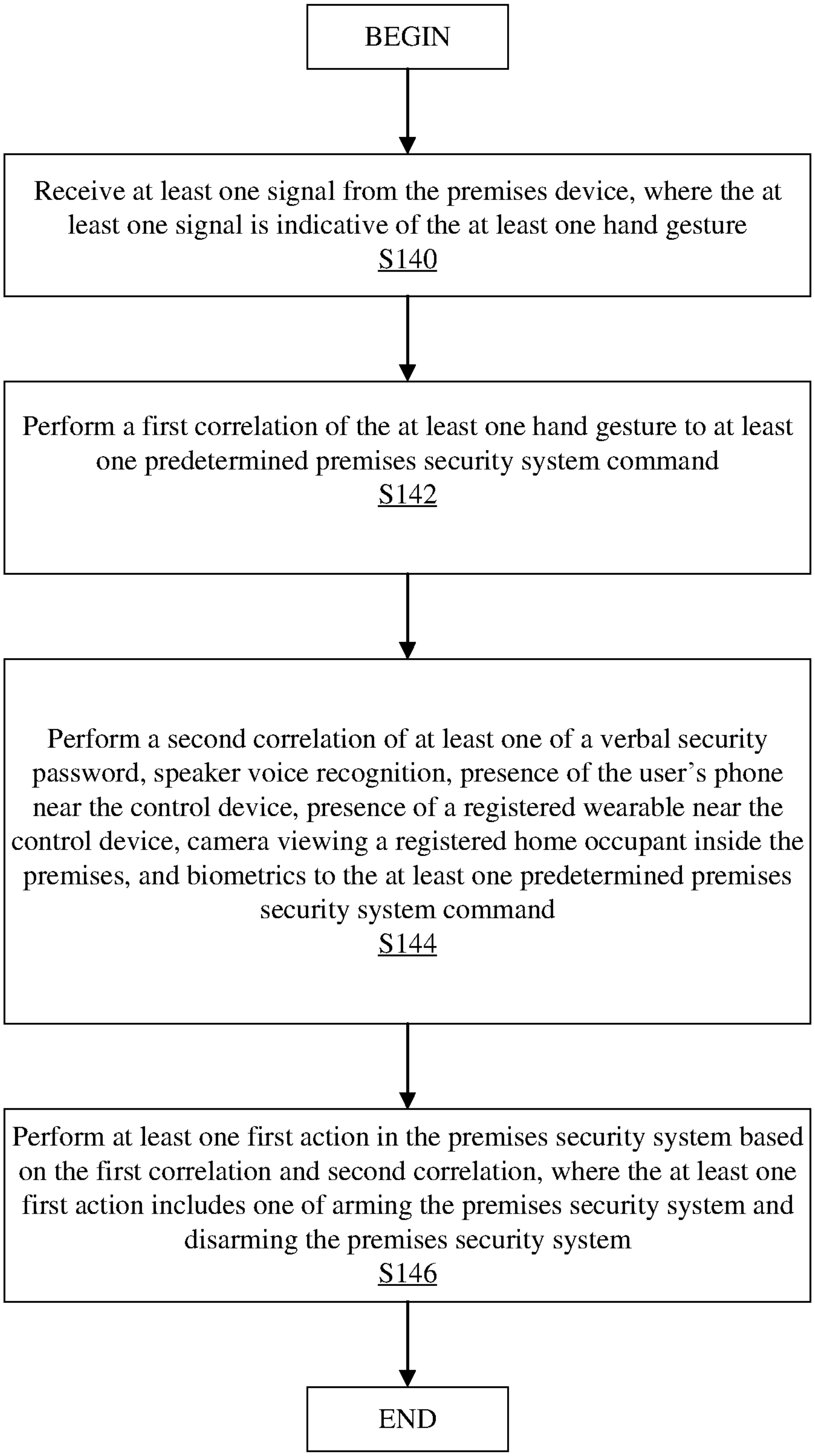
FIG. 9 is a flowchart of a process in a control device in accordance with the principles of the present invention.

FIG. 9 is a flow chart of another example process in the control device 18 of the premises security system 12. One or more blocks described herein may be performed by one or more elements of control device 18 such as by the processing circuitry 34 (including the command unit 19) and/or processor 36. The control device 18 is configured to communicate with a premises device 14 that includes a radar sensor 16 for sensing at least one hand gesture. The control device 18 is configured to receive (Block S140) at least one signal from the premises device 14, where the at least one signal is indicative of the at least one hand gesture. The control device 18 is configured to perform (Block S142) a first correlation of the at least one hand gesture to at least one predetermined premises security system command. The control device 18 is configured to perform (Block S144) a second correlation of at least one of a verbal security password, speaker voice recognition, presence of the user's phone near the control device, presence of a registered wearable near the control device, camera viewing a registered home occupant inside the premises, and biometrics to the at least one predetermined premises security system command. The control device 18 is configured to perform (Block S146) at least one first action in the premises security system 12 based on the first correlation and second correlation, where the at least one first action includes one of arming the premises security system 12 and disarming the premises security system 12.

In some embodiments, the at least one hand gesture includes a plurality of hand gestures sensed in a predetermined sequence, where the predetermined sequence correlates to the at least one predetermined premises security system command. In some embodiments, the plurality of hand gestures is sensed within a predetermined time interval, where the plurality of hand gestures sensed within the predetermined time interval correlates to the at least one predetermined premises security system command.

SOME EXAMPLES

Example A1. A control device 18 in a premises security system 12, the control device 18 comprising:

processing circuitry 34 configured to:

receive at least one signal indicative of at least one hand gesture;

correlate the at least one hand gesture to a predetermined command; and perform at least one action based on the correlation.

Example A2. The control device 18 of Example A1, wherein the at least one action includes at least one of arming the premises security system 12 and disarming the premises security system 12.

Example A3. The control device 18 of Example A2, wherein the at least one hand gesture includes a plurality of hand gestures, the plurality of hand gestures being sensed in at least one of a predetermined sequence and within a predetermined time interval.

Example B1. A premises security system 12, comprising:
- a premises device 14 in communication with a control device 18, the premises device 14 including:
- a radar sensor 16 configured to sense at least one hand gesture; and
- processing circuitry 24 in communication with the radar sensor 16, the processing circuitry 24 configured to:
  - determine if the sensed at least one hand gesture matches a predetermined hand gesture; and
  - transmit at least one signal indicative of the sensed at least one hand gesture to the control device 18 if the sensed at least one hand gesture matches the predetermined hand gesture;
- the control device 18 including processing circuitry 34 configured to:
  - receive the at least one signal indicative of the sensed at least one hand gesture;
  - correlate the sensed at least one hand gesture to a predetermined command; and
  - perform at least one action based on the correlation.

Example B2. The system of Example B1, wherein the at least one action includes at least one of arming the premises security system 12 and disarming the premises security system 12.

Example B3. The system of Example B2, wherein the at least one hand gesture includes a plurality of hand gestures, the plurality of hand gestures being sensed in at least one of a predetermined sequence and within a predetermined time interval.

Example B4. The system of Example B3, wherein:
- the radar sensor 16 is configured to track sub-millimeter motion; and
- the radar sensor 16 is one of a 60 GHz radar sensor and a 24 GHz radar sensor 16.

Example C1. A method implemented by a control device 18 in a premises security system 12, the method comprising:
- receiving at least one signal indicative of at least one hand gesture;
- correlating the at least one hand gesture to a predetermined command; and
- performing at least one action based on the correlation.

Example C2. The method of Example C1, wherein the at least one action includes at least one of arming the premises security system 12 and disarming the premises security system 12.

Example C3. The method of Example C2, wherein the at least one hand gesture includes a plurality of hand gestures, the plurality of hand gestures being sensed in at least one of a predetermined sequence and within a predetermined time interval.

Example D1. A method implemented by a premises device 14 in communication with a control device 18 in a premises security system 12, the method comprising:
- sensing at least one hand gesture;
- determining if the sensed at least one hand gesture matches a predetermined hand gesture;
- transmitting, to the control device 18, at least one signal indicative of the sensed at least one hand gesture if the sensed at least one hand gesture matches the predetermined hand gesture;
- receiving, at the control device 18, the at least one signal indicative of the sensed at least one hand gesture;
- correlating the sensed at least one hand gesture to a predetermined command; and performing at least one action based on the correlation.

Example D2. The method of Example D1, wherein the at least one action includes at least one of arming the premises security system 12 and disarming the premises security system 12.

Example D3. The method of Example D2, wherein the at least one hand gesture includes a plurality of hand gestures, the plurality of hand gestures being sensed in at least one of a predetermined sequence and within a predetermined time interval.

Example D4. The method of Example D3, wherein:
- the radar sensor 16 is configured to track sub-millimeter motion; and
- the radar sensor 16 is one of a 60 GHz radar sensor and a 24 GHz radar sensor 16.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A control device in a premises security system, the control device configured to communicate with a premises device that includes a radar sensor for sensing a plurality of hand gestures, the control device comprising:
processing circuitry configured to:
when the premises security system is armed:
initiate a timer in the premises security system for a user to disarm a premises security system before the control device triggers a premises security system alarm;
before the timer expires:
receive at least one signal from the premises device, the at least one signal being indicative of the plurality of hand gestures sensed within a predetermined time interval and in a predetermined sequence;
perform a first correlation of the predetermined sequence of the plurality of hand gestures to at least one predetermined premises security system command; and
perform at least one first action in the premises security system based on the first correlation associated with the at least one predetermined premises security system command, the at least one first action comprises adding additional time to the timer, the expiration of the timer being configured to trigger the premises security system alarm.

2. The control device of claim 1, wherein the additional time is added to the timer in the premises security system for performing at least one second action.

3. The control device of claim 2, wherein the at least one second action includes one of disarming the premises security system or transmitting instructions to the premises device to disarm the premises security system.

4. The control device of claim 1, wherein the processing circuitry is further configured to perform a second correlation of at least one of a verbal security password, a speaker voice recognition, a presence of a user's phone near the control device, a presence of a registered wearable near the control device, a camera viewing a registered home occupant inside the premises, and biometrics, to the at least one predetermined premises security system command; and
the at least one first action in the premises security system being based on the second correlation associated with the at least one predetermined premises security system command.

5. A premises security system, comprising:
a premises device in communication with a control device, the premises device including:
a radar sensor configured to sense hand based motion; and
processing circuitry configured to:
determine whether the sensed hand based motion is associated with a plurality of hand gestures sensed within a predetermined time interval and in a predetermined sequence; and
transmit at least one signal indicative of the plurality of hand gestures to the control device based on the determination that the hand based motion is associated with the plurality of hand gestures sensed within the predetermined time interval and in the predetermined sequence;
the control device including processing circuitry configured to:
when the premises security system is armed:
initiate a timer in the premises security system for a user to disarm a premises security system before the control device triggers a premises security system alarm;
before the timer expires:
receive at least one signal from the premises device, the at least one signal being indicative of the plurality of hand gestures;
perform a first correlation of the predetermined sequence of the plurality of hand gestures to at least one predetermined premises security system command; and
perform at least one first action in the premises security system based on the first correlation associated with the at least one predetermined premises security system command, the at least one first action comprises adding additional time to the timer, the expiration of the timer being configured to trigger the premises security system alarm.

6. The system of claim 5, wherein the at least one correlation further comprises performing at least one of a verbal security password, a speaker voice recognition, a presence of a user's phone near the control device, a presence of a registered wearable near the control device, a camera viewing a registered home occupant inside the premises, and biometrics.

7. The system of claim 5, wherein the additional time is added to the timer in the premises security system for performing at least one second action.

8. The system of claim 7, wherein the at least one second action includes one of disarming the premises security system, transmitting instructions to the premises device to and disarm the premises security system.

9. A method implemented by a control device in a premises security system, the control device configured to communicate with a premises device that includes a radar sensor for sensing a plurality of hand gestures, the method comprising:

when the premises security system is armed:

initiating a timer in the premises security system for a user to disarm a premises security system before the control device triggers a premises security system alarm;

before the timer expires:

receiving at least one signal from a premises device, the at least one signal being indicative of the plurality of hand gestures sensed within a predetermined time interval and in a predetermined sequence;

performing a first correlation of the predetermined sequence of the plurality of hand gestures to at least one predetermined premises security system command; and performing at least one first action in the premises security system based on the first correlation associated with the at least one predetermined premises security system command, the at least one first action comprises adding additional time to the timer, the expiration of the timer being configured to trigger the premises security system alarm.

10. The method of claim 9, wherein the additional time is added to the timer in the premises security system for performing at least one second action.

11. The method of claim 10, wherein the at least one second action includes one of disarming the premises security system or transmitting instructions to the premises device to disarm the premises security system.

12. The method of claim 9, further comprising performing a second correlation of at least one of a verbal security password, a speaker voice recognition, a presence of a user's phone near the control device, a presence of a registered wearable near the control device, a camera viewing a registered home occupant inside the premises, and biometrics, to the at least one predetermined premises security system command; and the at least one first action in the premises security system being based on the second correlation associated with the at least one predetermined premises security system command.

13. The method of claim 9, further comprising:

determining whether the plurality of hand gestures correspond to at least one of a first user and a second user;

when the plurality of hand gestures correspond to the first user, the at least one first action including arming the premises security system; and when the plurality of hand gestures correspond to the second user, the at least one first action being disarming the premises security system.

* * * * *